C. G. BROWN.
SOCKET FOR TWIST DRILLS.
APPLICATION FILED AUG. 18, 1908.

972,155.

Patented Oct. 11, 1910.

Witnesses:
John H. Parker
R. Wallace

Inventor:
Charles G. Brown
by Macleod, Calver, Copeland & Dike
Attorneys.

UNITED STATES PATENT OFFICE.

CHARLES G. BROWN, OF ATHENS, PENNSYLVANIA.

SOCKET FOR TWIST-DRILLS.

972,155.  Specification of Letters Patent.  Patented Oct. 11, 1910.

Application filed August 18, 1908. Serial No. 449,020.

*To all whom it may concern:*

Be it known that I, CHARLES G. BROWN, citizen of the United States, residing at Athens, in the county of Bradford and State of Pennsylvania, have invented a certain new and useful Improvement in Sockets for Twist-Drills, of which the following is a specification, reference being had therein to the accompanying drawings.

My invention has for its object an improvement in the holders for twist drills commonly known as collets and sockets, the object of the invention being to obviate the difficulty heretofore experienced with drills of this class due to the fact that the shanks of the drills frequently twist off and the drill is thereby completely spoiled.

My invention contemplates the employment of a drill which is formed by twisting and grinding a properly shaped bar of tool steel, instead of a drill made by the ordinary process of turning the drill in a lathe and milling the flutes in. The drill made in this peculiar shape requires to be used with a socket or collet also of peculiar construction which engages said drill at its greatest diameter, so that there is no danger that the shank will be twisted off.

Sockets and collets embodying my invention cost little or no more to make than do corresponding articles made in the form heretofore commonly employed, and since the special steel employed in the manufacture of these drills is exceedingly expensive, the saving resulting from the employment of my invention, which enables drills to be used with less danger of breaking, is considerable.

The invention will be fully understood from the following description taken in connection with the accompanying drawings and the novel features will be pointed out and clearly defined in the claims at the close of the specification.

Figure 3:
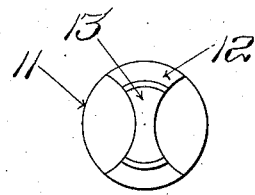
Figure 6:
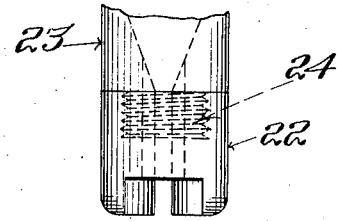
Figure 1:
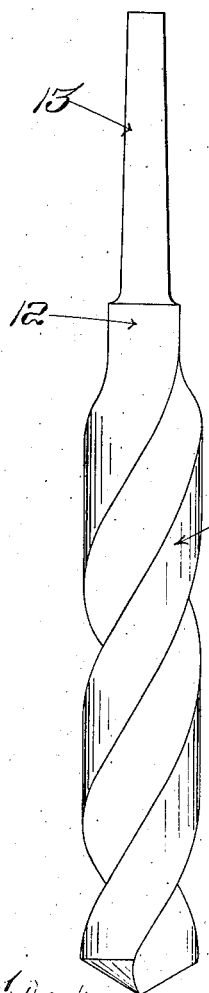
Figure 4:
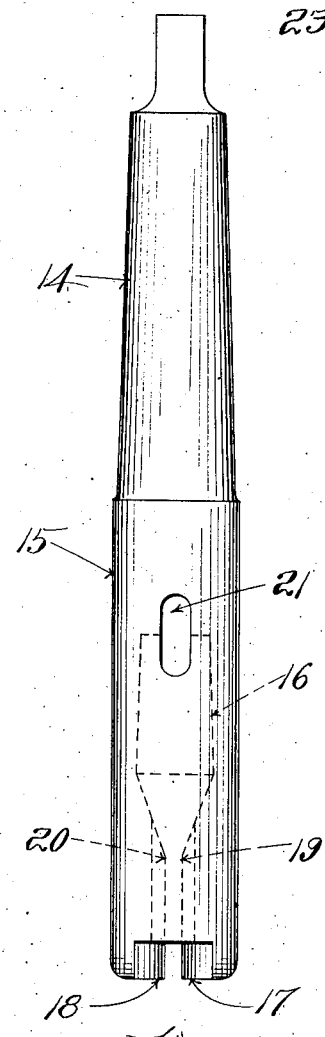
Figure 5:
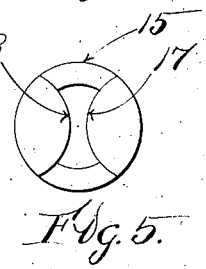
Figure 2:
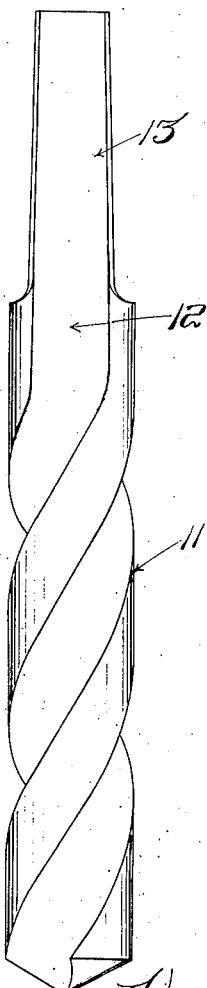

In the drawings,—Figure 1 is a side view of a drill made in accordance with my invention. Fig. 2 is a side elevation of the drill shown in Fig. 1. Fig. 3 is a plan of the drill showing the shape of the shank. Fig. 4 is a side elevation of a socket made in accordance with my invention. Fig. 5 is an end view of a socket shown in Fig. 4. Fig. 6 is a side elevation of the end of the socket made in accordance with my invention.

Referring to the drawings,—At 11 is indicated the body of a twist drill made from a bar or channel of suitable steel which is twisted to the proper shape and then ground. As will be seen in Fig. 3, the flutes of the drill extend the entire length of the shank 13 with which it is provided.

The drill is driven by the engagement of the socket or collet with the portion of the drill marked 12. It will be seen from Fig. 2 that this shoulder is of the same diameter as the body 11 of the drill, so that there is no danger of twisting off the part of the drill by which it is driven. The shank 13 is tapering and serves to center and steady the drill in the socket or collet but the said drill is not driven by power applied to said shank.

In Fig. 4, there is shown the collet. At 14, is indicated the stem and at 15 the body portion into which the shank 13 of the drill is inserted. The interior of the body 15 is tapered as shown at 16 to afford a seat for the shank 13 so that the drill will turn true when in place in the collet. The lower end of the body 15 of the collet has a hole of peculiar shape formed therein which conforms to the special shape of the drill. These curved portions are shown at 17 and 18 in Figs. 4 and 5 corresponding to the curves of the cross section of the shoulder 12 of the drill, that is, the said curved portions 17 and 18 conform to the shape of the flutes of the drill. Said curved or rounded portions 17 and 18 also extend for a short distance into the interior of the body of said collet as shown at 19 and 20 so that a portion of the shank is engaged by these surfaces. The drill is readily put in place in the collet by inserting the end of the shank 13 between the curves 17 and 18, then sliding the drill upward until the shank engages the tapered surfaces 16 intended to receive them. The drill is removed in the ordinary way by driving a wedge or drift pin into the hole 21.

In Fig. 6 is seen a socket for use with drills of the kind shown herein. This socket is made in the manner substantially like the collet shown in Fig. 4, except that it is made in two parts, the lower part 22 being screwed to the upper part 23 as shown at 24.

In manufacturing collets such as are shown in Fig. 4, the collets are first cast from suitable material in molds having cores for the holes, that is—the hole 2 for the drift pin and the central hole, which, when the collet is completed, receives the shank of the drill. The casting is then heated to a suitable temperature and a drift or plug having a cross-section like that of the drill to be used with the collet is driven into the central hole, thus shaping the hole to conform to the shape of the drill to be used. This operation leaves the shoulders 17 and 18 of the exact shape and size required and gives them the proper smoothness. After the drift or plug has been removed and the casting cooled, an arbor having an end of the shape of the shank of the drill is inserted in the central hole, and the arbor and casting are put in a lathe and the casting is turned to the desired final form. I believe this process of manufacture to be novel and accordingly reserve for myself the right to make application for Letters Patent thereon.

What I claim is:

1. The combination with a twist drill with the flutes extending the length of the drill and its shank, said shank tapering throughout substantially its entire length; of a collet having a hole therein corresponding in shape with and for the reception of the tapering shank of the drill and having a pair of shoulders conforming to the shape of the flutes of the drill and engaging the said flutes when the drill is in position.

2. The combination with a twist drill with the flutes extending the length of the drill and its shank, said shank tapering throughout substantially its entire length; of a collet having a hole therein corresponding in shape with and for the reception of the tapering shank of the drill and having a pair of shoulders, the space between which conforms substantially to the cross-section of the drill at the point of contact with the shoulders.

3. The combination with a twist drill with the flutes extending the length of the drill and its shank, said shank tapering throughout substantially its entire length and having a shoulder of a diameter equal to that of the drill; of a collet having a hole therein corresponding in shape with and for the reception of the tapering shank of the drill and having a pair of shoulders conforming to the shape of the flutes of the drill and engaging the said flutes at the shoulder of the drill.

4. The combination with a twist drill with the flutes extending the length of the drill and its shank, said shank tapering throughout substantially its entire length; of a collet having a hole therein corresponding in shape with and for the reception of the tapering shank of the drill and having a pair of shoulders at the mouth of said tapering hole conforming to the shape of the flutes of the drill and engaging the said flutes when the drill is in position.

In testimony whereof I affix my signature, in presence of two witnesses.

CHARLES G. BROWN.

Witnesses:
WM. DOUGLAS MOORE,
EDMUND R. DAVIES.